ID

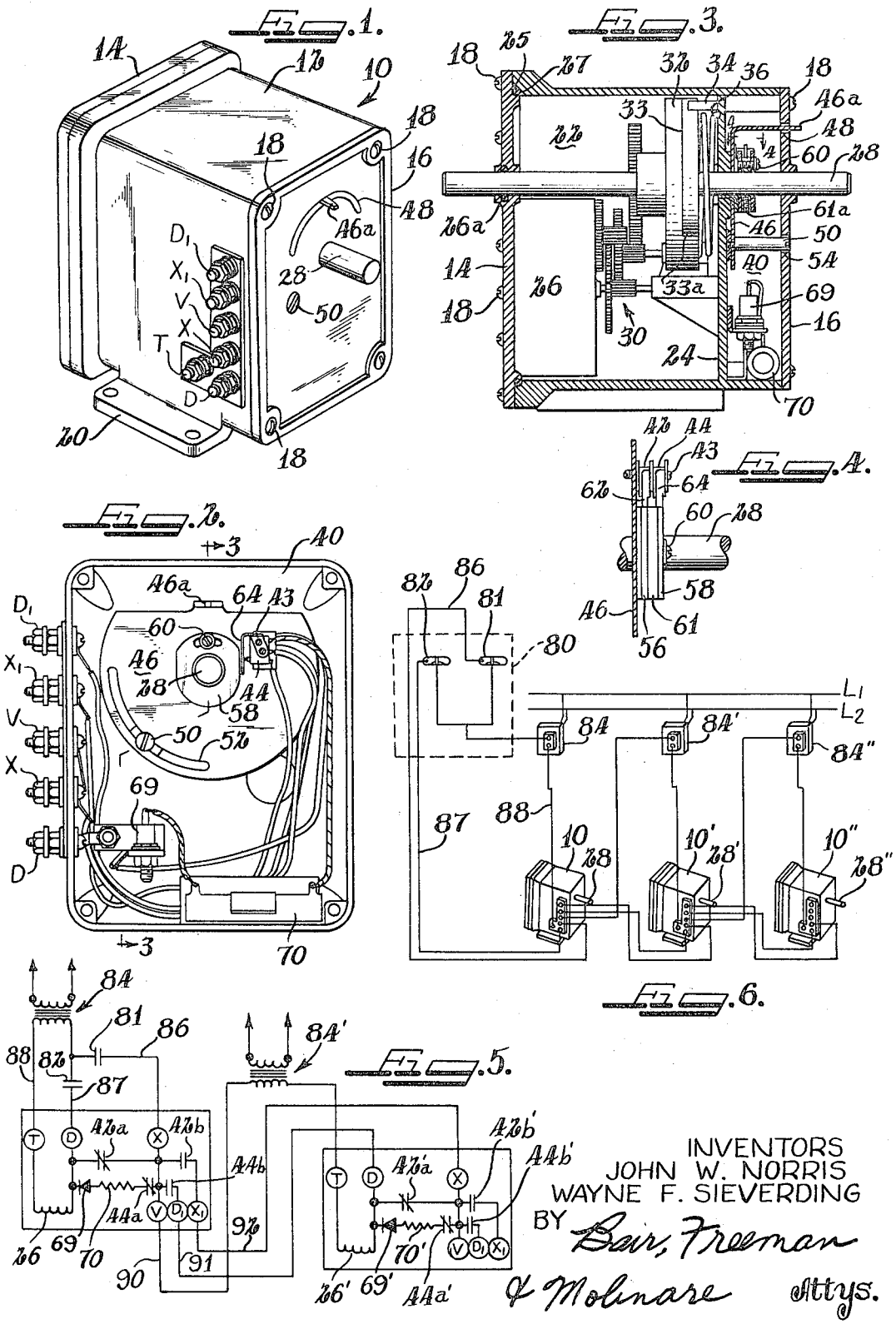

United States Patent Office 3,384,800
Patented May 21, 1968

3,384,800
DAMPER MOTOR ASSEMBLY
John W. Norris, Marshalltown, and Wayne F. Sieverding, Union Grove Lake, Iowa, assignors to Lennox Industries Inc., a corporation of Iowa
Filed Jan. 18, 1965, Ser. No. 426,180
10 Claims. (Cl. 318—265)

ABSTRACT OF THE DISCLOSURE

A damper motor assembly having a shaft selectively positionable at one of three positions by means including an A-C motor having a rectifier in circuit therewith, with spring means operative on the shaft to return it to a starting position.

---

This invention relates to a control motor assembly and, more particularly, to a three-position, spring-return type control motor assembly particularly adapted for actuating damper linkage in an air treating unit.

Heretofore, spring-return type damper control motor assemblies have included an electric motor for rotating a shaft through predetermined angular movement from a first position to a second position, such motor being connected to the output shaft for actuating damper linkage through gear reduction mechanism. Spring means were utilized to return the output shaft to its initial position. Typically, prior constructions comprised two-position spring-return type control motor assemblies. Due to design requirements and the demand for greater precision in control of air treating units, it is desirable to more accurately control the positioning of the dampers in such air treating unit.

An object of the present invention is to provide an improved three-position, spring-return control motor assembly which comprises an alternating current motor for driving an output shaft and control means for selectively stopping the output shaft at a predetermined third position, such control means selectively rectifying the current flow to said alternating current motor to stall said motor and hold said output shaft at the third position.

A further object of the present invention is to provide an improved three-position, spring-return damper motor which comprises an alternating current motor for driving an output shaft from a first position to a second position, and means for selectively stopping the output shaft at a predetermined third position intermediate the first position and the second position, the third position being adjustable through a relatively wide range, and the means for selectively stopping the motor shaft functioning to rectify the current flow to said motor to stall said motor and hold said output shaft at said third position.

Yet another object of the present invention is to provide an improved control motor assembly comprising an alternating current motor for driving an output shaft through reduction gear mechanism from a first position to a second position, spring means for returning the output shaft to said first position when the motor is deenergized, and control means for selectively rectifying the power supplied to said motor to stall the motor and stop the output shaft at a predetermined intermediate position, such control means including switch means for permitting "slaving" of the operation of a second control motor assembly from the temperature responsive control of the first control motor assembly.

Other objects and advantages of the present invention will become more apparent hereinafter.

The specific structural details and their mode of functioning will be made most manifest and particularly pointed out in clear, concise and exact terms in conjunction with the accompanying drawings, wherein:

FIGURE 1 is a perspective view of a control motor assembly embodying the principles of this invention;

FIGURE 2 is an end view of the control motor assembly with an end cover removed to better illustrate the control means for selectively stalling the motor to stop the output shaft at a predetermined position;

FIGURE 3 is a cross-sectional view of the control motor assembly taken generally along the line 3—3 of FIGURE 2;

FIGURE 4 is a detail view taken generally along line 4—4 of FIGURE 3 illustrating the relationship between the cam means and the switch means within the control motor assembly;

FIGURE 5 is a schematic wiring diagram for the control motor assembly, and illustrating a pair of damper control motors adapted to be actuated from a single control; and FIGURE 6 is a schematic illustration of three control motor assemblies actuated from a common thermostat.

Referring now to FIGURES 1–4, there is illustrated a damper control motor assembly 10 embodying the present invention. The assembly 10 comprises a tubular housing 12 which is adapted to be closed at each end by covers 14 and 16, respectively, that are affixed to the housing by suitable fastening means, as for example, screws 18. Provided on the housing 12 is an angular flange 20 having suitable openings therein for permitting affixation of the housing to a suitable support in an air treating unit.

Defined within the housing 12 between the side wall of the housing 12, the cover 14 and the interior wall 24 of housing 12 is a sealed motor compartment 22 that is ordinarily filled with oil. A resilient O-ring seal means 25 is provided in a recess 27 in an enlarged end portion in the wall of housing 12 to seal between the cover 14 and the housing to prevent the loss of oil from within the housing. An O-ring seal 26a is provided to prevent leakage of oil between shaft 28 and the shaft opening in cover 14. A suitable non-temperature sensitive oil, as for example, a silicon oil, may be provided within the chamber 22 for permanent lubrication of gear train 30. The alternating current motor 26, which may be of the shaded pole type, is suitably affixed within the compartment 22 and is adapted to drive the output shaft 28 through a gear train mechanism indicated generally at 30.

The output shaft 28 is journaled within an end cover 14 and an opening in the intermediate wall 24 of housing 12. It will be understood that, in use, the motor 26 will drive the output shaft through a predetermined angular rotation from a first position to a second position. Carried on the shaft 28 is a hub 32 provided with a recess 33 therein. The annular recess is not continuous but is provided with a stop wall or shoulder 33a adapted to engage with a stop pin 34 affixed to the wall 24. Thus, on the power stroke, the motor 26 will drive the output shaft 28 through the gear mechanism until the wall 33a of the recess 33 in hub 32 engages the stop pin 34 and the rotation of the output shaft is stopped. A suitable clutch mechanism (not shown) may be provided to prevent damage to the motor 26 and gear train 30 when rotation of hub 32 is stopped upon engagement of wall 33a with pin 34.

Spring means 36, which is operatively positioned between the wall 24 and the hub 32, normally urges shaft 28 toward its initial position and functions to return the shaft to its initial position when the motor is deenergized. In one application, the initial position of shaft 28 corresponds to a preset minimum position of the dampers and the second position (wherein the hub engages stop 34) corresponds to a wide open position of the dampers. The foregoing described structure is of known design.

A feature of the present invention is the provision of control means for providing an adjustable intermediate position of the output shaft. As shown in the presently preferred form of the invention, FIGURES 2 and 3, the means for stopping the output shaft at a selected adjusted position are housed in a control compartment 40 defined between housing 12, wall 24, and end cover 16.

The control means include a pair of single-pole, double-throw switches 42 and 44 mounted on plate 46, which has an opening therein through which the output shaft may freely pass. The switches 42 and 44 are suitably affixed to the plate 46, as for example, by screws 43. Formed integrally with and extending transversely from the plate 46 is a positioning lever 46a which extends through an elongated slot-like opening 48 in cover 16 so as to be accessible from exterior of the housing 12 for angularly positioning the plate 46 about the axis of the output shaft 28 for a purpose to be made more apparent hereinafter. The plate 46 is retained in selected adjusted position by lock means comprising an elongated screw 50 which engages within an elongated angular slot 52 in plate 46. The screw 50 is accessible through opening 54 in plate 46. When the screw 50 is loosened, plate 46 may be rotated about the axis of shaft 28 to a predetermined position. Then screw 50 is tightened to retain the plate 46 in place.

Cam means are rotatably carried with the shaft 28 for actuating the switches. The cam means comprise a pair of cams 56 and 58 of similar predetermined configuration which are retained in predetermined position with respect to one another on spacer member 61 by retaining screw 60. The spacer member 61 is affixed to shaft 28 by suitable set screw means 61a.

The switch means 42 and 44 are carried on plate 46 at a position where they can be actuated by the cam means. Cam 56 is adapted to engage lever arm 62 made from resilient spring metal to actuate switch 42 and cam 58 is adapted to engage lever arm 64 made from resilient spring metal to actuate switch 44. The switches are adjusted in such manner that switch 42 is actuated by exactly the same position on the power stroke as switch 44 is actuated on the spring return stroke.

The switch means 42 and 44 are in circuit with rectifying means 69 for selectively rectifying the flow of current to alternating current motor 26 and thereby stall the motor to stop the output shaft at a selected position.

The rectifying means may be a silicon solid state rectifier. A dropping resistor 70 is placed in series with the rectifier 69 for protecting the rectifier against excessive current.

A plurality of terminals T, D, X, V, $D_1$, and $X_1$ extend through the wall of housing 12. Terminals T, D, and X may be used to connect the electrical components within control motor assembly 10 to an operating circuit. Terminals V, $D_1$, and $X_1$ may be utilized when it is desired to connect a second control motor assembly in slave relationship to the first assembly 10.

Referring now to FIGURES 5 and 6, there are shown schematically electrical circuits for operating a plurality of damper control motor assemblies from a single thermostat control. The thermostat 80, illustrated schematically in FIGURE 6 is of the type which provides for two stages of control and includes a pair of mercury bulbs 81 and 82 mounted on a single temperature responsive bimetal element (not shown). The mercury switches are thus always in phase with one another. Each mercury switch is of the very sensitive type that makes and breaks on little change of position, e.g., one-third of one angular degree (equivalent to one-third of one temperature degree in this instrument). The thermostat 80 may be a Lennox type T870 F1062 Thermostat.

The thermostat 80 is adapted to be disposed in the area to be conditioned. Each motor (10, 10' and 10'') is in circuit with a transformer (84, 84' and 84'') via lead lines $L_1$ and $L_2$, which are connected to a suitable source of power, for example, a 115-volt 60-cycle source. The transformers are adapted to provide a reduced voltage power supply, for example, 24-volt 60-cycle current, for operating the control motor assemblies.

Switch 81 is connected to control motor assembly 10 via line 86 and switch 82 is connected to the motor assembly via line 87. The transformer 84 and motor assembly 10 are connected by line 88.

In FIGURE 6, there is shown an arrangement wherein a single thermostat 80 controls three damper motor assemblies. If desired, thermostat 80 may be used to control only a single assembly 10 and assemblies 10' and 10'' (together with the associated transformers 84' and 84'') may be removed from the circuit.

Considering now FIGURE 5, there is shown a schematic electrical wiring diagram wherein a single thermostat is used to control two control motor assemblies 10 and 10'. As above noted, if desired, lines 90, 91 and 92 may be disconnected and the transformer 84' and assembly 10' removed. The temperature responsive thermostat switches 81 and 82 would then control only damper motor assembly 10.

Generally, when motor 26 is energized, the output shaft 28 will be rotated on the power stroke toward full open position to actuate the damper linkage. At full open position, shoulder 33a in recess 33 of hub 32 will strike stop 34 in the housing 12. When the motor is de-energized, the spring 36 biases the output shaft 28 through a return stroke to its initial position, thereby actuating the damper linkage to move the dampers to their initial position. The motor assembly is constructed and arranged for operation so that the spring can return the shaft 28 either to open or to close the dampers, depending upon whether heating or cooling is to be controlled in the specific application.

To stall the motor so as to stop output shaft 28 at a predetermined intermediate position, rectified current is supplied to the motor.

Considering now the operation of the control motor assembly, when the thermostat 80 within the area to be conditioned senses a demand for heating, switch 81 is closed. A circuit is completed via contact 42a and motor 26, energizing the motor and causing rotation of shaft 28 via gear train means 30.

When the preset intermediate position of output shaft 28 is reached, cam 56 actuates switch 42 to open contact 42a and close contact 42b. Power will then flow to the motor 26 through a circuit which includes contact 44a, resistor 70 and rectifier 69, thus permitting the flow of only rectified current to alternating current motor 26, thereby causing the motor to stall and stopping rotation of shaft 28.

Upon closure of switch 82 in response to further demand, the flow of 24-volt power to motor 26 across terminals T and D is permitted and motor 26 rotates shaft 28 to the end of the power stroke where hub 32 engages mechanical stop 34 and is stopped, also stopping shaft 28. Suitable clutch mechanism of known construction may be provided to prevent damage to the motor 26 and gear means 30 when hub 32 engages stop 34.

When switch 81 and 82 open, upon satisfaction of the demand condition, the circuit to motor 26 is broken, and the shaft 28 will be returned to the starting position or first position by spring means 36.

It will be observed that the operation of a second damper control motor assembly 10' may be controlled by the same control means employed for assembly 10. This desired function is obtained by advantageously utilizing the normally open contacts 42b and 44b of switches 42 and 44, respectively. Thus, by the present invention, a single low-voltage thermostat may be used to control a plurality of motor assemblies while actually handling the current draw of only one motor.

Considering the operation of slave motor assembly 10', it is noted that when contact 42a is opened, contact 42b will be closed. A circuit will be completed to motor 26' via line 92, contact 42a', motor 26' and line 90, thereby energizing motor 26'. The motor 26' will rotate until the cam means associated therewith opens switch 42a', thereby permitting only rectified current to flow to motor 26' and stalling motor 26'. When contact 44b is closed, full power will be supplied to motor 26' via lines 90 and 91, thus driving motor 26 to the end of its power stroke. Upon opening of switch 82, the flow of current to motor 26' will be terminated, and the output shaft 28' of motor 26' will be returned to its initial position by the return spring associated therewith.

The present invention provides a unique three-position, spring-return damper control motor assembly wherein the control of the intermediate position is 100 percent electrical and is obtained by selectively supplying rectified current to stop the motor. The intermediate position is easily adjustable from external of housing 12 by loosening lock screw 50 and actuating extension or tab 46a to rotate plate 46 angularly about the axis of shaft 28. In one presently preferred form of the invention, the intermediate position is adjustable through a range of from 0 percent to 75 percent of total travel.

Incorporated within the novel damper control motor assembly are switch means which permit electrically slaving a second damper motor assembly from the control signal to the first control motor assembly. This feature is desirable when the damper motor assembly is controlled directly from an anticipated thermostat, for it permits a single low-voltage thermostat to control two or more control motor assemblies while actually handling the current draw of only one motor.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

We claim:

1. In a control motor assembly having an alternating current motor adapted to be connected to a source of alternating current for moving an output shaft from a first position to a second position and spring means operatively associated with said output shaft for restoring the output shaft to said first position, the improvement comprising control means for stopping the output shaft at a position intermediate said first position and said second position, said control means including a rectifier in circuit with said motor for rectifying the alternating current supply to said motor, switch means for selectively connecting said rectifier in circuit with said source of alternating current, and cam means on said output shaft for actuating said switch means to pass all current through said rectifier and thereby to stall said motor and hold said output shaft at said intermediate position, said switch means comprising a first normally-closed switch for permitting the flow of alternating current to said motor and a second normally-closed switch in series with said rectifier, said second switch and said rectifier being connected in parallel with said first switch, whereby when said first switch is open, the supply of alternating current to said motor will pass through said second switch and said rectifier and be rectified.

2. A control motor assembly as in claim 1 wherein the switch means are adjustable with respect to the cam means in order to selectively adjust said intermediate position.

3. A control motor assembly as in claim 2 wherein said switch means are mounted on a plate constructed and arranged to be moved angularly about the axis of the output shaft for adjusting the position of the switch means relative to the cam means.

4. In a damper control motor assembly having an alternating current motor adapted to be connected to a source of alternating current for moving an output shaft from a first position to a second position and spring means operatively associated with said output shaft for restoring the output shaft to said first position, the improvement comprising control switch means responsive to predetermined temperature conditions for actuating said motor to drive it toward its second position, control means for stopping the motor shaft at a position intermediate said first position and said second position, said control means including a rectifier in circuit with said motor for rectifying the alternating current supplied to said motor, a first normally-closed switch in circuit with said motor, and a second normally-closed switch in series with said rectifier, said first switch being disposed in parallel with said rectifier and said second switch and cam means on said output shaft for actuating said first switch and said second switch, whereby when said first switch is closed, alternating current is supplied to said motor to actuate same and when said output shaft rotates a predetermined distance, said cam means operate to open said first switch and place the rectifier in circuit with the source of alternating current, so as to rectify the current supplied to the motor and stall the motor.

5. A control motor assembly as in claim 4 wherein said cam means comprises a pair of cams, one for operating each switch, said cams being adjustable angularly about the output shaft with respect to one another so as to actuate the first switch on the power stroke at the same position that the second switch is actuated on the spring return stroke.

6. A control motor system comprising a first control motor assembly and a second motor control assembly, each assembly having a alternating current motor adapted to be connected to a source of power for moving an output shaft in a power stroke from a first position to a second position, spring means operatively affixed to the output shaft for urging the output shaft toward its first position, and control means for stopping the output shaft at a position intermediate said first position and said second position, said control means including a rectifier in circuit with said motor for rectifying the alternating current supplied to said motor, first switch means having a normally-closed contact in circuit with said motor and second switch means having a normally-closed contact in series with said rectifier, said first contact being disposed in parallel with said rectifier and said second contact and cam means on said output shaft for actuating said first and second switch means, said first and second switch means in said first control motor assembly each including a normally-open contact adapted to close when said associated normally-closed contact is opened, said normally-open contacts of each of said first and second switch means being in circuit with said second control motor assembly for stalling said motor in said second control motor assembly responsive to stalling said motor in said first control motor assembly.

7. In combination, a first control motor assembly; a second motor control assembly; two-stage, temperature-responsive means for controlling operation of said first motor control assembly; each motor control assembly having an alternating current motor adapted to be connected to a source of power for moving an output shaft in a power stroke from a first position to a second position, spring means operatively affixed to the output shaft for urging the output shaft toward its first position, and control means for stopping the output shaft at a position intermediate said first position and said second position, said control means including a rectifier in circuit with said motor for rectifying the alternating current supplied to said motor, first switch means having a normally-closed contact in circuit with said motor and second switch means having a normally-closed contact in series with said rectifier, said first contact being disposed in parallel with said rectifier and said second contact, and cam means on said output shaft for actuating said first and second switch means; said first and second switch means in said first control motor assembly each including a normally-open contact adapted to close when said associated normally-closed contact is opened, said normally-open contacts of each of said first and second switch means being in circuit with said second control motor assembly for controlling said motor in said second control motor assembly responsive to said temperature-responsive means, whereby said temperature-responsive means functions to control the second control motor assembly in slave relationship to the first control motor assembly.

8. A three-position, spring-return control motor assembly comprising an alternating current motor adapted to be connected to a source of alternating current for moving an output shaft from a first position to a second position, spring means operatively associated with said output shaft for restoring the output shaft to said first position, and control means for stopping the output shaft at a position intermediate said first position and said second position, said control means including a rectifier in circuit with said motor for rectifying the alternating current supplied to said motor, first switch means including a normally-closed contact in circuit with said motor and second switch means including a normally-closed contact in series with said rectifier, said first normally-closed contact being disposed in parallel with said rectifier and said second normally-closed contact, and cam means on said output shaft for actuating said first switch means and said second switch means, whereby, alternating current is supplied to said motor through said first normally-closed contact to actuate the motor, and when said output shaft rotates a predetermined distance, said cam means actuates said first switch means to open said first normally-closed contact and place the rectifier in circuit with the source of alternating current so as to rectify the current supplied to the motor and stall the motor to hold the output shaft at said intermediate position.

9. In combination, a control motor assembly and a two-stage, temperature-responsive control for operating said control motor assembly in response to predetermined temperature conditions, said control motor assembly comprising an alternating current motor having an output shaft movable between a first position and a second position, spring means operatively associated with said output shaft for restoring the output shaft to said first position, and control means for stopping the output shaft at a position intermediate said first position and said second position, said control means including a rectifier in circuit with said motor for rectifying the alternating current supplied to said motor, first switch means including a normally-closed contact in circuit with said motor and second switch means including a normally-closed contact in series with said rectifier, said first normally-closed contact being disposed in parallel with said rectifier and said second normally-closed switch, and cam means operatively associated with said output shaft for actuating said first switch means and said second switch means, whereby, upon closure of the first stage of said temperature-responsive control, alternating current is supplied to said motor through said first normally-closed contact to actuate the motor, when said output shaft rotates a predetermined distance, said cam means actuates said first switch means to open said first normally-closed contact and place the rectifier in circuit with the source of alternating current so as to rectify the current supplied to the motor and stall the motor to hold the output shaft at said intermediate position; upon closure of the second stage of said temperature-responsive control, alternating current is supplied directly to said motor to drive the output shaft to said second position; and upon opening of said temperature-responsive control, said motor is deenergized and said spring means returns said output shaft to said first position.

10. In combination, a control motor assembly adapted to control operation of a second control motor assembly, and a two-stage, temperature-responsive control means for controlling said control motor assemblies in response to predetermined temperature conditions, said first control motor assembly comprising an alternating current motor adapted to be connected to a source of alternating current for rotating an output shaft from a first position to a second position, spring means operatively connected to said output shaft for rotating the output shaft to said first position, and control means for stopping the output shaft at a position intermediate said first position and said second position, said control means including a rectifier for rectifying the alternating current supplied to said motor, first switch means including a normally-closed contact in circuit with said motor and a normally-open contact adapted to be connected to a second control motor assembly, and second switch means including a normally-closed contact in series with said rectifier and a normally-open contact adapted to be connected to the second control motor assembly, said first normally-closed contact being in parallel with said rectifier and said second normally-closed contact, and cam means operatively associated with said output shaft for actuating said first switch means and said second switch means, whereby, upon closure of the first stage of said temperature-responsive control means, a circuit is completed to said motor through said first normally-closed contact for supplying alternating current to said motor to energize same and rotate said output shaft, said cam means actuating said first switch means after predetermined rotation of said output shaft (a) to open said first normally-closed contact and place the rectifier in circuit with the source of alternating current to rectify the current supplied to the motor so as to stall the motor and hold the output shaft at said intermediate position, and (b) to close said first normally-open contact to complete a circuit for actuating an alternating current motor in said second control motor assembly; upon closure of the second stage of said temperature-responsive control means, alternating current is supplied directly to said motor to drive the output shaft to said second position; and upon opening of said temperature-responsive control means, said spring means returns said output shaft to said first position.

References Cited

UNITED STATES PATENTS

| | | | |
|---|---|---|---|
| 1,937,929 | 12/1933 | Williams et al. | 318—160 X |
| 2,029,615 | 2/1936 | Gille | 318—160 X |
| 2,054,368 | 9/1936 | Fisher | 318—160 X |
| 2,445,531 | 7/1948 | Mesh | 318—160 X |
| 2,501,245 | 3/1950 | White | 318—160 X |
| 3,189,806 | 6/1965 | Page | 318—466 X |

ORIS L. RADER, *Primary Examiner.*

B. A. COOPER, *Assistant Examiner.*